US008355021B2

(12) United States Patent
Wenger

(10) Patent No.: US 8,355,021 B2
(45) Date of Patent: Jan. 15, 2013

(54) FUSED VOLUME RENDERING

(75) Inventor: Andreas Wenger, Hersberg (CH)

(73) Assignee: Siemens Aktiengesellschaft, Munich (DE)

( * ) Notice: Subject to any disclaimer, the term of this patent is extended or adjusted under 35 U.S.C. 154(b) by 982 days.

(21) Appl. No.: 11/959,535

(22) Filed: Dec. 19, 2007

(65) Prior Publication Data

US 2008/0284781 A1 Nov. 20, 2008

Related U.S. Application Data

(60) Provisional application No. 60/938,558, filed on May 17, 2007.

(51) Int. Cl.
*G06T 17/00* (2006.01)
(52) U.S. Cl. ....................................................... 345/424
(58) Field of Classification Search ........................ None
See application file for complete search history.

(56) References Cited

U.S. PATENT DOCUMENTS

| 6,496,190 | B1 * | 12/2002 | Driemeyer et al. | 345/619 |
| 6,751,785 | B1 * | 6/2004 | Oh | 716/112 |
| 7,424,381 | B2 * | 9/2008 | Park | 702/69 |
| 2004/0207622 | A1 * | 10/2004 | Deering et al. | 345/426 |
| 2008/0086297 | A1 * | 4/2008 | Li et al. | 704/3 |

OTHER PUBLICATIONS

Link et al.; Multi-Resolution Volume Rendering with per Object Shading; Vision, Modeling and Visualization, Nov. 2006.*
Jie Zheng; Hongbing Ji; Wanhai Yang; , "Interactive PC Texture-Based Volume Rendering for Large Datasets," Innovative Computing, Information and Control, 2006. ICICIC '06. First International Conference on , vol. 2, No., pp. 350-353, Aug. 30, 2006-Sep. 1, 2006.*
Maria Ferre, Anna Puig, and Dani Tost; A framework for fusion methods and rendering techniques of multimodal volume data: Research Articles. Comput. Animat. Virtual Worlds 15, 2 (May 2004), 63-77.*
Grimm et al.; Flexible Direct Multi-Volume Rendering in Dynamic Scenes; VmV, Nov. 2004.*
Viola et al.; Importance-Driven Volume Rendering; IEEE Visualization 2004; Oct. 2004.*
Muller et al.; Optimized Volume Raycasting for Graphics-Hardware-based Cluster Systems; Eurographics Symposium on Parallel Graphics and Visualization 2006; May 2006.*
Kaufman et al.; Overview of Volume Rendering; The Visualization Handbook, 1st Ed., pp. 127-174, Academic Press Dec. 2004.*
Puig et al.; Design of a Multimodal Rendering System; Proceedings of the Vision, Modeling, and Visualization Conference 2002 (VMV 2002), pp. 489-496; Nov. 2002.*

* cited by examiner

*Primary Examiner* — Kee M Tung
*Assistant Examiner* — Carlos Perromat
(74) *Attorney, Agent, or Firm* — Donald B. Paschburg

(57) ABSTRACT

A rendering system having a customizable database of compositing rule tables that define how the input volumes are to be combined based on the their type, i.e. anatomical, functional, etc. The system also allows for the customization of the transfer function types associated with each type of input volume. Enabling this customization is a modularization of the rendering system such that the image formation process is shielded form the actual input volume configuration. This includes the building of a database of shaders that embody the compositing rules defined in a selected table matching the input volume configuration. This shader database in conjunction with a spatially subdivided/bricked representation of the input volumes allows the system to manage the overall complexity of the image formation process by locally selecting the cheapest/least complex shader. Thus allowing for more complex compositing rules with minimal impact on the rendering performance.

8 Claims, 3 Drawing Sheets

FUSED VOLUME RENDERING

CROSS-REFERENCE TO RELATED APPLICATIONS

This application claims priority from U.S. Provisional application No. 60/938,558 filed May 17, 2007, the entire subject matter thereof being incorporated herein by reference.

TECHNICAL FIELD

This invention relates generally to fused volume rending.

BACKGROUND

As is known in the art, modern medical technology provides different modalities for acquiring 3D data, such as computed tomography ("CT"), magnetic resonance imaging ("MRI"), positron emission tomography ("PET"), and ultrasound. The information obtained from different modalities is usually complementary; for example, CT or MRI provides structural (i.e., anatomical) information (dataset) while PET or fMRI provides functional information. Thus, it is generally desirable to fuse or merge these multiple volumetric datasets.

More particularly, oftentimes in scientific and medical data visualization we are confronted with volumetric data that contains a multitude of distinct data values at each spatial location (i.e., voxel), e.g., a data value from MRI and a different data value from PET). It is challenging to manage and visualize this type of data efficiently. Thus, one of the main difficulties with multivariate volume visualizations is the fact that multiple data values are competing for the same space, i.e. in the spatial domain but also in their visual representation such as color and opacity. To tackle this problem of locally competing data values we need to define how the individual color and opacity values assigned to each volume are composited/combined to form a single color and opacity representing all volumes at a given location in space. Performing this task efficiently, i.e. creating visualizations that are easy to read despite the complexity of the data, requires knowledge about the type of volumes and how they relate to each other. The most common tool used to simultaneously display multiple volumes is a fused volume renderer. Previous methods used in fused volume rendering can be categorized into two groups: First, general-purpose fused volume renderers, which provide a tool that can render any kind of input data without knowing anything about the application domain the data is coming from. It is capable of fusing the datasets using simple compositing usually some form of linear blending between the datasets. These type of renderers can be implemented very efficiently as each volume can be treated individually and sampled at its native resolution. Second, on the opposite end of the spectrum we have the special-purpose fused volume renderer. Its advantage is the ability to incorporate domain knowledge and provide a custom tailored solution for a given problem. The problem of special-purpose renderers though is their lack of flexibility. Because they are custom tailored solutions they are difficult to adapt to new domains. Another issue with special-purpose renderers is that the interactivity is often hampered by more complex compositing methods used during rendering. Or the opposite to guarantee interactivity compositing methods had to be kept simple, thus not allowing for the best possible visualization.

SUMMARY

In accordance with the present invention, a volumetric renderer is provided for rendering a scene having a set of volumetric scans and a set of manipulators for enabling a user to interact with the rendering. The renderer includes: a compositing rule table database having therein a plurality of compositing rule tables, each one of the tables providing the compositing rules for a different combination of input volumetric scans into the rendered scene. A data manager receives the different volumetric scans and builds therefrom a renderer queue, a set 3D textures in graphics memory and a type signature. The data manager prepares a specific one of the volumetric scans for rendering by packing the specific one of the volumetric scans into a 3D texture and creates the render queue having a list of volume bricks. The data manager also creates a type signature based on the types and sequence of the volumetric scans contained in the scene. A shader builder is provided for: receiving the type signature of the volumetric scans from the data manager; for receiving shader functionality from the data manager, the sampler and the transfer functions (TFs) in the scene; and for selecting a compositing rule table from the database based on the type signature of the volumetric scans and for building a shader database from the received shader functionality and a selected one of the composting rule tables. The sampler receives the render queue, the 3D textures and the shader database for rendering an image of the volumetric scans. For each brick contained in the depth-sorted render queue the sampler determines the least complex shader based on the render parameters and transfer functions in the scene, binds such shader and the required textures to form the final image one brick at a time.

In accordance with the invention, a method is provided for incorporating domain knowledge into a fused volume renderer rendering a scene consisting of a set of volumetric scans, including manipulators for enabling a user to interact with the visualization. The renderer includes: a customizable database of compositing rule tables containing a plurality of tables specifying the rules on how to combine a the volumetric scans, each table catering to a different set of input volumetric scans. When confronted with a specific set of volumetric scans, the method determining the type signature of the volumetric scans; and obtains a compositing rule table matching such type signature from such database of compositing rule tables.

In one embodiment, a renderer is provided for controlling rendering a scene consisting of a set of volumetric scans, including manipulators for enabling a user to interact with the visualization. The renderer comprises: a table of compositing rules containing the compositing rules for every possible combination of the volumetric scans in the scene; a shader builder building a shading language, for example, an OpenGL shading language shader for each compositing rule in such table and storing such shader in a shader database; a spatially subdivided/bricked representation of the volumetric scans in the scene, a render queue, with each brick providing local min/max values for each such volumetric scan; a set of transfer function associated with each volumetric scan in the scene. The render queue traverses each brick to determine the least complex compositing rule as a function of the bricks min/max values and how they are mapped through such set of transfer functions; retrieves a shader from the database matching such compositing rule, and binds such shader and finally rendering the brick.

The fused volume rendering system (i.e., renderer) and method according to the invention provides the flexibility of a general-purpose renderer and the ability to incorporate domain knowledge like the special-purpose renderer. It further provides means to incorporate complex compositing with minimal impact on the rendering performance. The volumetric renderer according to the invention is highly reconfigurable, such that it would be adaptable to novel domains with very little effort. Thus striking a balance between the flexibility of a general-purpose renderer yet allowing for the incorporation of domain knowledge to achieve superior visualizations. Additionally, the invention enables managing the complexity of complicated compositing rules by allowing the system to locally choose the least complex shader required to generate a correct image.

Flexibility and incorporation of domain knowledge is achieved by modularizing the system, by abstracting the input volumes from the image formation module and by providing a customizable module that allows for the definition of how to locally combine the individual input volumes to form a single color and opacity representing all the volumes. The modularization of the fused volume renderer makes for a very flexible system allowing one to specify a number of features independently, including as mentioned above the way, combining the volumes to form a single color. Additionally, with the invention, one can specify for each individual volume how to map a data value to a color and opacity. Also due to the modularization the system can represent the input volumes in graphics memory as it sees fit and can provide a spatial data structure to the sampler for rendering.

The management of complexity draws from the observation that many times volumetric scans such as functional scans and fieldmaps have features that localize well, i.e. the interesting data is restricted to small areas of the total geometric extent of the scans. This knowledge allows one to exploit the sparsity of the features and locally decide what the complexity is required to combine the volumes. To enable the system to make that choice a whole set of rules is provided that define how to combine the volumes instead of a single complex rule. The rules that define how to combine the volumes are called compositing rules and the set of these rules is called a compositing rule table. Assuming two volumes A and B are to be combined, three rules or three entries in the table are required: one rule for each volume A and B individually and one rule when both volumes need to be combined. Now as the system encounters an area where only volume A is visible it picks up the rule that only covers volume A, if there is an area that requires only volume B the rule for volume B is used and in areas where A and B coexist the rule that combines A and B is selected. As the rules for volume A and B individually are likely to be less complex than the rule that combines volume A and B, the invention can locally reduce the complexity. The complexity of the compositing rules directly translates to the complexity of the shaders required to render the output image. By locally always picking the minimally complex shader, the overall complexity can be reduced to render the image. A reduction in the overall complexity to render the output image yields improved interactivity of the system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
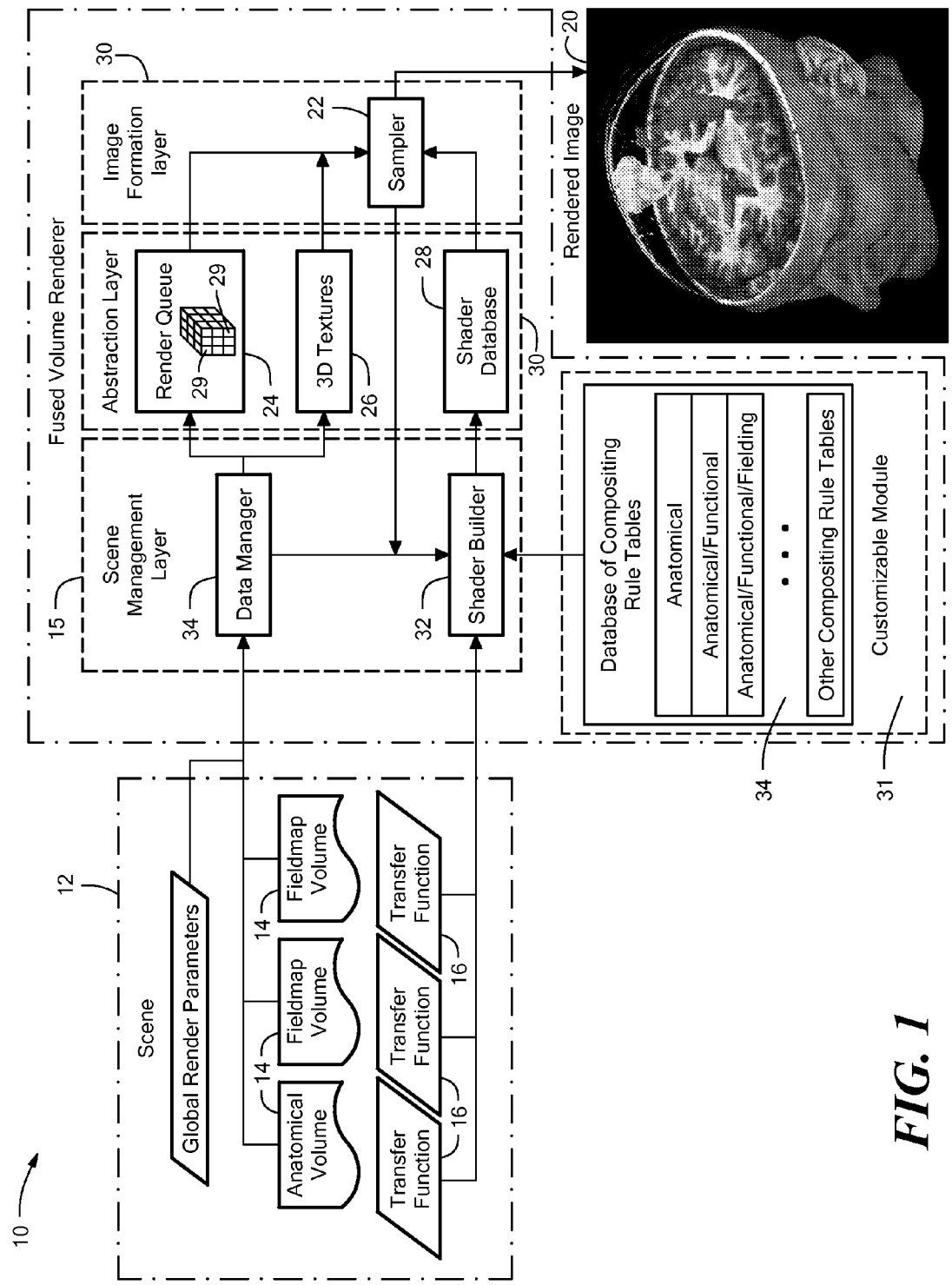
FIG. 1 is a block diagram of a renderer according to the invention.

Referring now to FIG. 1, the fused volume rendering system 10 takes as its input a scene 12 consisting of a series of volumetric scans (volumes) 14 usually each of a different type, e.g. an anatomical scan, a functional scan and a fieldmap. To provide the user with means to interact with the volumes 14, the system 10 associates a transfer function (TF) 16 with each volume 14 and stores them in the scene 12. On top of that, the system 10 creates an object called render parameters 18 and also stores it in the scene 12. The render parameters 18 allows the user to show and hide entire volumes 14 or select alternate rendering styles. Alternate rendering styles can include but are not limited to Phong shading, silhouette shading and no shading. Once the scene 12 is completed according to the above specifications, the fused volume renderer 10 can process the scene 12 and create an image 20 from it.

The image formation process or rendering of the volumes 14 is performed by a component in the system referred to as a sampler 22. The sampler 22 defines how the process computes the line integrals along the viewing rays to form the projected view of the volumes 14. There are a variety of standard methods, such as view aligned texture slicing, GPU ray-casting etc. to perform this task, any one of which can be employed. Here, the process uses a GPU ray-caster. For the sampler 22 to work independently of the number and types of input volumes 14, it relies on the help of three additional components of the system: a render queue 24, a number of 3D textures 26, and a shader database 28. These three components serve as the abstraction layer between the sampler 30 and the input volumes 14.

The 3D textures 26 hold the data of the different input volumes 14. There is not necessarily a one to one correspondence between the input volumes 14 and the 3D textures 26. Multiple input volumes 14 might be packed into the different channels of a single 3D texture.

The render queue 24 is a hierarchical spatial data structure, e.g. an octree or BSP-tree, representing the geometry of the input volumes 14. Every node/brick 29 (i.e., sub-volume) in the render queue 24 provides texture coordinates to retrieve the data from the 3D textures 26. Additionally every brick 29 in the queue 24 also holds some local statistics, e.g. minimum and maximum values of each input volume 14 within the geometric extent of the brick 29. Finally each brick 29 holds a bit-field, herein referred to as the local render parameters. The local render parameters of a given brick 29 specify which volumes 14 are visible and what render style to use for each volume 14.

The third component supporting the sampler 22 is the shader database 28. The shader database 28 provides a set of shading language shaders, here for example, GLSL shaders that the sampler 22 uses to compute the line integrals along the viewing rays. The shader database 28 contains a shader for every possible combination of the input volumes 14 and render styles associated with such volumes, e.g. assuming the input volumes 14 are an anatomical volume with no shading and silhouette shading render styles, a functional volume with no shading and Phong shading render styles and a fieldmap with no shading render style, then the shader database 28 contains 17 shaders. The sampler 22 locally picks the least complex shader from the database 28 based on the local render properties of the currently rendered brick 29. Use of the shader database 28 instead of a single shader covering the most complex case is similar to level of detail approaches rendering complex models. Instead of managing the geometric detail, the local shader complexity required to compute the line integral is managed.

A customizable module 31 is provided. The module 31 includes a database 34 of compositing rule tables, where each entry in this database caters to a different set of input volumes. This database 34 specifies what kind of volume type configurations are supported by the system 10 and how the volumes 14 are composited. This database 34 allows the rapid customization for new domains. A cardio application most likely requires a different set of compositing rule tables than a neuro application and yet another set than colon application for example. Therefore the system 10 can adapt the system 10 to novel domains without the need to change any other components in the system 10. Each table/entry in the database contains a compositing rule covering every possible combination of such set of input volumes. Additionally the table can associate render styles with each of the input volumes. By specifying more than one rendering style per volume the number of combinations required to be covered by the table grows rapidly. A compositing rule defines how the input volumes are combined to locally generate a single color and opacity representing all the input volumes.

The interface between the input 12 scene and the rest of the system 10 is scene management layer 15, including the data manager 34 and the shader builder 32. More particularly, the component that builds the shader database 28 is called the shader builder 32. To build a working shader, information is required from a number of components: a data manager 34, to know how to retrieve the data from the 3D textures 26 and what the type signature of the input volumes is; the sampler 22 to specify how to compute the line integral and the transfer functions 16 specified in the scene 12 to map the data values of the input volumes 14 to color and opacity values; and finally a database 34 of compositing rule tables from which the shader builder 32 picks one compositing rule table based on the input volume type signature. The compositing rule table 34 specifies how to locally combine the input volumes to form a single color and opacity.

Let's consider our previous example with an anatomical volume 14, a functional volume 14 and a fieldmap 14 each with the same render styles as above. Thus, to cover all possible combinations we need 17 shaders in the shader database 28. Each of these shaders in shader database 28 is based on one of the 17 compositing rules contained in the compositing rule table 34 (below), such table describing all possible combinations of an anatomical volume 14 with no shading and silhouette shading render styles, a functional volume with no shading and Phong shading render styles and a fieldmap with no shading render style. The table contains 17 compositing rules:

| | Anatomical Volume | | Functional Volume | | Fieldmap |
|---|---|---|---|---|---|
| | no shading | sil. shading | no shading | Phong shading | no shading |
| 0 | ✓ | | | | |
| 1 | | ✓ | | | |
| 2 | | | ✓ | | |
| 3 | | | | ✓ | |
| 4 | | | | | ✓ |
| 5 | ✓ | | ✓ | | |
| 6 | | ✓ | ✓ | | |
| 7 | ✓ | | | ✓ | |
| 8 | | ✓ | | ✓ | |
| 9 | ✓ | | | | ✓ |
| 10 | | ✓ | | | ✓ |
| 11 | | | ✓ | | ✓ |
| 12 | | | | ✓ | ✓ |
| 13 | ✓ | | ✓ | | ✓ |
| 14 | | ✓ | ✓ | | ✓ |
| 15 | ✓ | | | ✓ | ✓ |
| 16 | | ✓ | | ✓ | ✓ |

For all these components to work together and allow the shader builder 28 to build a working OpenGL shading language shader, the shader builder 28 relies on an functional specification specifying a set of functions, plus which of the components have to implement which functions and which functions are available in a given component.

The OpenGL shading language code for compositing rule 13 in the above table might look as follows:

```
vec4 morpheus_shade( )
{
  vec4 color;
  vec4 fieldmap_color = morpheus_color_vol2( );   // fieldmap
  if(fieldmap_color.a)
    color = fieldmap_color;
  else
  {
    vec4 color_anatomy = morpeus_color_vol0( );   // anatomy
    vec4 color_activation = morpeus_color_vol1( );   // activation
    color = mix(color_anatomy, color_activation, color_activation.a);
  }
  return color;
}
```

The compositing rule is required by the functional specification to implement the function morpheus_shade( ). To do that it has a number of functions and global variables available, such as the function morpheus_color_voli( ) or the global variables_morpheus_gradient_voli and_morpheus_view_vec_voli. These functions and variables are defined by other components in the system, e.g. morpheus_color_voli( ) is defined by a transfer function, where_morpheus_gradient_voli and_morpheus_view_vec_voli are defined by the data manager. The shader functionality of scalar pre-integrated transfer function might look as follows:

```
uniform sampler2D tf_tex;
vec2 tf_sample;
void morpheus_update_tf( )
{
    tf_sample.x = tf_sample.y;
}
vec4 morpheus_color( )
{
    return texture2D(tf_tex, tf_sample);
}
```

The complete functional specification will be outlined in a later section.

The data manager 34 is the component that builds the 3D textures 26 and the render queue 24. It is also responsible for determining the input volume type signature, i.e. what types of volumes and in what sequence are they input to the system.

Let's consider our previous example with anatomical, functional and fieldmap volumes 14. If the user loads an additional volume 14 or removes a volume 14 from the scene 12, the data manager 34 and the shader builder 32 have to process the novel scene, update the 3D textures 26, build a new render queue 24 and determine what compositing rule table to pick up from the database 34 and finally build a new shader database 28. In other words, every time the input changes, the components in the abstraction layer 30 have to be updated.

The system 10 operates in three stages: the customization stage 42 (FIG. 2), where the compositing rule tables stored in the database 34 (FIG. 1) are defined and what types of volumes 14 are associated with what type of transfer functions 16; the initialization stage 44 (FIG. 2), creates all the modules in the system if not already created and then updates the modules in the abstraction layer; and finally, the rendering stage 44 (FIG. 2) where the output image is generated based on the information provided in the abstraction layer. In the following sections we will discuss each of these stages in more detail referring to FIG. 2.

Figure 2:
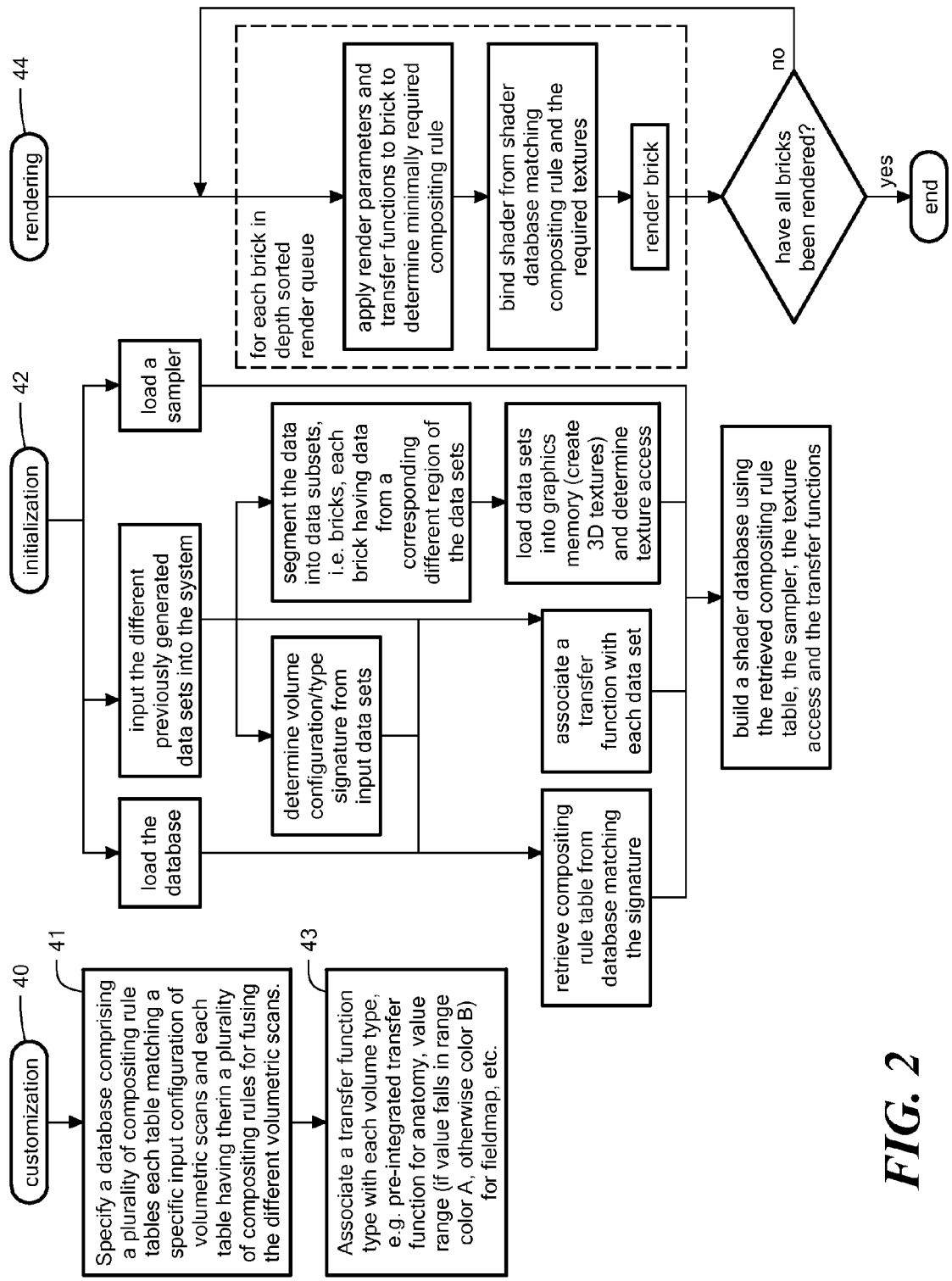
FIG. 2 is a flowchart of different stages: customization, initialization and rendering the system of FIG. 1 goes through according to the invention.

Briefly, and referring to FIG. 2, during the customization phase 40, a database is established by an expert or systems administrator with a plurality of compositing rule tables database 34 (FIG. 1), each table matching a specific input configuration of volumetric scans and each table having therein a plurality of compositing rules for fusing the different volumetric scans, Step 41. A transfer function type is associated with each volume type, e.g. pre-integrated transfer function for anatomy, value range (if value falls in range color A, otherwise color B) for fieldmap, etc., Step 43.

During the initialization phase 42, the process:

(A) inputs the different, previously generated, data sets (i.e., the scene 12 (FIG. 1), i.e., volumes 14, render parameters 18, and transfer functions 16) into the system 10, determines volume configuration/type signature from input data sets;

(B) retrieves compositing rule table from database 34 matching "the" type signature of the input volumes; and (C) associates a transfer function with each data set;

(D) segments the data into data subsets, i.e. bricks, each brick having data from a corresponding different region of the data sets, and loads data sets into the graphics memory (i.e., creates 3D textures) and determines texture access;

(E) builds the shader database 28 using the retrieved compositing rule table 34, the sampler 22, the texture access information and the transfer functions.

During the rendering phase 44, the process, for each in the depth sorted render queue 24, applies render parameters 18 and transfer function 16 to the brick to determine minimally required compositing rule, binds shader from database 34 matching compositing rule, and the required textures, and then renders the brick. The process repeats the process until all bricks in the render queue 24 have been rendered.

Figure 3:
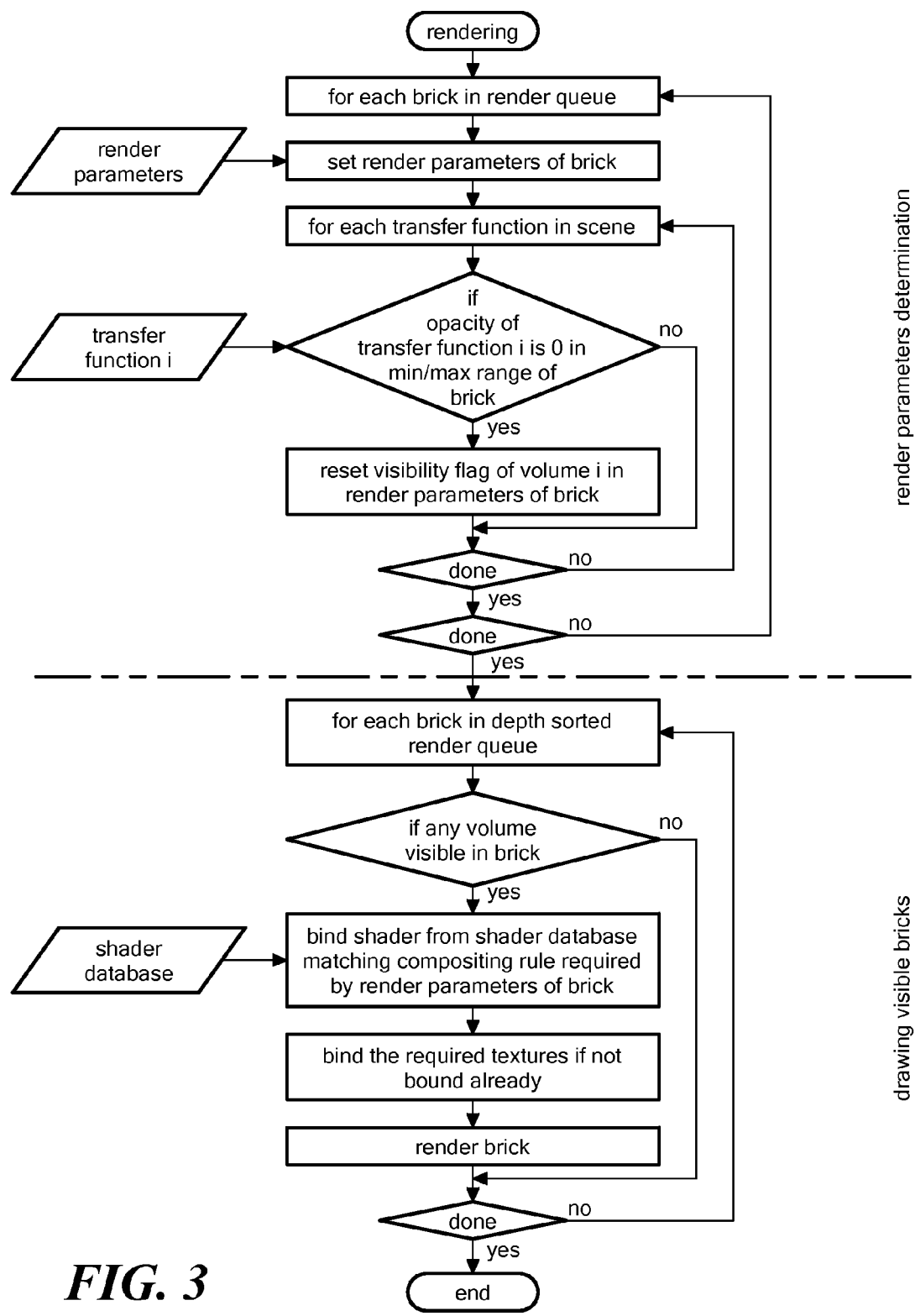
FIG. 3 is a more detailed flowchart of the rendering process used by the renderer of FIG. 1 according to the invention Like reference symbols in the various drawings indicate like elements.

The rendering process is described in more detail in FIG. 3. Thus, for each brick in render queue 24, the process, in a rendering parameter determination phase, the process sets the render parameters of brick; for each transfer function in scene, the process determines whether the opacity of transfer function of the brick is 0 in min/max range of brick. If yes, the process resets a visibility flag of volume i in render parameters of brick. During a subsequent drawing visible brick phase, the process, for each brick in depth sorted render queue, the process determines whether there is any volume visible in brick. If yes, the process binds a shader from shader database matching compositing rule required by render parameters of brick and then binds the required textures if not bound already. Next, the process renders the brick.

More particularly:

Customization

The customization stage 40 is where an expert or systems administrator supplies the fused volume rendering system 10 with the domain knowledge required to generate meaningful visualizations. The domain knowledge is expressed in two types of specifications.

First, the user (i.e., expert) specifies what kind of volume type combinations are likely to be encountered in the given application domain, Step 41. For simplicity let's assume the following seven combinations of volumes 14 are possible:

1. anatomical volume
2. functional volume
3. fieldmap
4. anatomical volume+functional volume
5. anatomical volume+fieldmap
6. functional volume+fieldmap
7. anatomical volume+functional volume+fieldmap Each of these combinations results in an entry into the compositing rule table database. The expert then has to define the compositing rule table for each volume combination, i.e. to define a table such as seen in the table above and implement the functions required from the functional specification for each compositing rule. Defining this table also includes the specification of alternate rendering styles if so desired. Often times compositing rules or entire compositing rule tables can be reused from other application domains making this task much simpler.

The second specification that allows the expert to incorporate domain knowledge is what type of volume is associated with what type of transfer function. In the above example it makes sense to use a scalar pre-integrated transfer function to map data values from anatomical volumes and functional scans to color and opacity, providing good rendering quality for both volumes. For the fieldmap though which can be thought of a something similar to a mask we can use a simpler transfer function that simply assigns color and opacity A to data values falling into a given range and color and opacity B to values falling outside that range. In most cases if the values are within some tolerance the fieldmap is not shown and only the anatomical and functional data is shown, i.e. opacity A is 0.0. Should the data values fall outside the range though, we want to show the fieldmap opaque in say fuchsia. This results in color B defined as [1.0, 0.0, 1.0, 1.0] (assuming RGBA color space).

The combination of specifying the compositing rule tables as well as the volume type to transfer function type mapping allows the expert to control many of the visual aspects of the visualization.

Initialization

In the initialization stage we first load the previously defined compositing rule table database and a desired sampler. We also provide the system with a set of volumes that were generated at some earlier time and stored as files. Once the set of input volumes is specified the system determines the type signature of the input volumes, i.e. the type of each volume in sequence. Once the type of each volume is determined we associate a transfer function with each of them according to the specifications in the customization stage and we can retrieve the compositing rule table from the database matching the type signature. At the same time once the input volumes are specified we can build a hierarchical spatial data structure by segmenting the volume into bricks. In our current implementation we use a binary-space-partitioning (BSP) tree. Depending on the input volume resolutions we usually subdivide to a level that yields bricks of size no smaller than 16×16×16 voxels or 8×8×8 voxels. Each brick aside from its geometric extent holds the minimum and maximum values for each input volume. This BSP tree represents our render queue. To finalize the render queue we first have to determine how to load the input volumes into graphics memory. Once the volumes are loaded into 3D textures, we can finalize the render queue by assigning each brick the texture coordinates required to access the data in the 3D textures. Additionally we now know where the data of each input volume is stored. This is crucial information that is required by the shader builder.

The current state of affairs is as follows: the sampler is loaded, we have the correct compositing rule table matching the type signature of the input volumes, each volume has a transfer function associated with it and we have determined how to access the data of each volume in the 3D textures in graphics memory. Each of these four components needs to provide the shader builder with a specific set of functions and global variables. The shader builder takes this information and builds a series of valid OpenGL shading language shader out of it. This series of GLSL shaders is our shader database. The function and variable specification that allows the shader builder to tie the four components together defines which component has to implement which functions and define which global variables. It also regulates the access to these functions and global variables, i.e. which component can access which functions and variables. The following list shows the functional specification broken down into the functions and variables available and provided by each component:

Compositing Rule:
Functions and variables available:

| vec4 morpheus_color_voli( ); | // computes the local color value for the ith volume |
| vec3 _morpheus_gradient_voli; | // the non-normalized local gradient in voxel space |
| | // using central difference operator |
| vec3 _morpheus_view_vec_voli; | // the non-normalized view vector (sample location to |
| | // camera position) in voxel space of volume i |
| vec3 _morpheus_light_vec_voli; | // the non-normalized light vector (sample location to |
| | // light source position) in voxel space of volume i |
| vec4 _morpheus_patient_sample_pos; | // global sample position in patient coordinate space |
| vec4 _morpheus_patient_camera_pos; | // global camera position in patient coordinate space |
| vec4 _morpheus_patient_light_pos; | // global light position in patient coordinate space |

Functions provided:
vec4 morpheus_shade( ); // computes the local RGBA color

Transfer Function:
Functions provided:

| void morpheus_update_tf( ); | // allows for sample propagation, e.g. |
| | // preintegrated transfer functions |
| vec4 morpheus_color( ); | // computes the local color value for the |
| | // ith volume (morpheus_color( ) will |
| | // automatically turn into |
| | // morpheus_color_voli( ) based on the |
| | volume association, do not use the _voli) | variables available:

| vec3 _morpheus_gradient; | // the non-normalized local gradient in voxel |
| | // space using central difference operator |
| | // (_morpheus_gradient will automatically |
| | // turn into _morpheus_gradient_voli based |
| | on the volume association, do not use |
| | the _voli) | additionally provides:

| _morpheus_sampleij; | // the jth global sample storage for volume i, |
| | // index mapping is provided (type can be float, |
| | vec2, vec3, vec4) |

Data Manager:
.requires:

| _morpheus_sampleij; | // the jth global sample storage for volume i, |
| | // index mapping is provided by TransferFunction | functions and variables provided:

```
void morpheus_init( );          // allows the packer to initialize the global variables if required
void morpheus_sample( );        // retrieves the local sample and stores it into the variables provided by
                                // TransferFunction, as well as updates all the other required global
                                // variables (must be called before morpheus_shade( ) and
                                // morpheus_update_tf( ))
void morpheus_init_translate_with(vec4 pv);      // tell morpheus by how much you wan to
                                                  // translate the samples, pv is specified
                                                  // in patient coordinates
void morpheus_translate_sample_pos( );           // translates the samples along the vector
                                                  // previously specified with
                                                  // "morpheus_init_translate_with"
void morpheus_translate_sample_pos(float fraction);  // translates the samples by a fraction of the
                                                      // previously specified translation
vec4 morpheus_xform_patient2samplek(vec4 pv);    // transforms the vector pv from
                                                  // patient coordinate space into sample
                                                  // coordinate space of texture k
vec3 _morpheus_gradient_voli;   // the non-normalized local gradient in voxel space
                                // using central difference operator
vec3 _morpheus_view_vec_voli;   // the non-normalized view vector (sample location to
                                // camera position) in voxel space of volume i
vec3 _morpheus_light_vec_voli;  //the non-normalized light vector (sample location to
                                // light source position) in voxel space of volume i
vec4 _morpheus_sample_posk;     // global sample positions in texture coordinate space.
                                // the samples are initialized in the vertex shade
                                // (varying are read-only in fragment shader so
                                // depending on use we might need to copy data into
                                // global variable)
vec4 _morpheus_patient_sample_pos;   // global sample position in patient coordinate space
vec4 _morpheus_patient_camera_pos;   // global camera position in patient coordinate space
vec4 _morpheus_patient_light_pos;    // global light position in patient coordinate space
```

Sampler:
functions and variables available:

```
void morpheus_init( );          // allows the packer to initialize the global variables if required
                                // must be called before any sampling can take place
vec4 morpheus_shade( );         // provided by Shader
void morpheus_update_tf( );     // provided by Shader Database Builder based on the code in
                                // TransferFunction (-> chance for optimization)
void morpheus_sample( );        // provided by Data Manager
void morpheus_init_translate_with(vec4 pv);       // provided by Data Manager
void morpheus_translate_sample_pos( );            // provided by Data Manager
void morpheus_translate_sample_pos(float fraction);  // provided by Data Manager
vec4 morpheus_xform_patient2samplek(vec4 pv);     // provided by Data Manager
vec4 _morpheus_sample_posk;     // the sample position variables provided by Data Manager
vec4 _morpheus_patient_sample_pos;   // global sample position in patient coordinate space
vec4 _morpheus_patient_camera_pos;   // global camera position in patient coordinate space
vec4 _morpheus_patient_light-pos;    // global light position in patient coordinate space
``` provides:

The GLSL shader "void main( )" function and writes the appropriate output variables, e.g. gl_FragColor, etc.

The shader builder scans each of the components compositing rule, transfer functions and shader for the functions and variables it uses. This allows the shader builder to optimize the code by only providing code for functions and variables that are actually required. Another method that the shader builder utilizes to optimize the performance of the code is to inline the functions provided by the different components, thus eliminating the costs introduced by the overhead of calling a function. Once the shader builder has compiled the source code from the functional specification it generates a GLSL shader from it. The shader builder goes through this process for each compositing rule in the compositing rule table. With the shader database completed all the components in the abstraction layer are ready for rendering.

Rendering

The rendering stage of the system is controlled by the sampler. The sampler uses the three components from the abstraction layer render queue, 3D textures and shader database to render an output image. During rendering the sampler traverses the bricks in the render queue. For each brick it determines the cheapest compositing rule required to render said brick faithfully, binds the shader from the shader database matching the just determined compositing rule, binds any required textures and draws the brick. Every brick in the render queue holds a bit field, called the local render parameters. This bit field is the key to determine what the minimally required compositing rule is needed to properly render a given brick. The bit field allows the system to keep track of what volumes are visible in a brick and what render style is to be used. FIG. 3 provides a more detailed view of the rendering process performed by the sampler. In general the process can be split into two halves. First we determine the render parameters of each brick and second we draw the visible bricks in depth-sorted order.

In the first step of the rendering process the sampler traverses the render queue with the goal to determine the local render parameters of each brick, i.e. find out what volumes are visisble, and what render styles to use. For each brick we first set the local render parameters to the global render parameters provided by the input scene, see FIG. 1. The global render parameters provide the means for the user to show and hide individual volumes and to select render styles for each volume. The second step in determining the local render properties is to check the bricks minimum and maximum values of each volume against the associated transfer functions, e.g. a bricks min/max values of the anatomical volume fall into a region of the anatomical transfer function that at least partially maps to an opacity of non-zero, the min/max values of the functional volume within said brick fall into a region of the functional transfer function that completely maps to zero and the min/max values of the fieldmap fall into a region of the fieldmap transfer function that maps at least partially to non-zero. Given this situation we know that the functional volume within this brick is invisible and the anatomical volume and the fieldmap are visible, and we accordingly set the bits in the local render parameters of this brick. Once done with all the bricks in the render queue we know how to render each brick and we can proceed to the drawing part of the rendering process.

As the goal of the rendering process is to compute the line integrals along the viewing rays, we need to draw the bricks in the render queue in a depth-sorted fashion. For each brick in depth-sorted order we check if any volume is visible, if not we skip this brick, otherwise we use the bricks local render parameters to find the shader with the compositing rule that matches the render parameters and bind it. To get the brick ready for rendering we also make sure all necessary textures are bound. Once the shader and textures are bound we render the brick, thus drawing the part of the volumes covered by the geometrical extent of the brick. When all the bricks are drawn we have a complete image of the input volumes mapped through the respective transfer functions, the render styles applied and combined/fused with the selected compositing rule table.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented system for fused volumetric rendering of a scene from a set of volumetric scans acquired from different imaging modalities, the system implemented by the computer comprising:
   a central processing unit;
   a compositing rule table database having therein a plurality of compositing rule tables, wherein each table provides compositing rules for a different combination of volumetric scans into the rendered scene;
   a data manager for receiving the volumetric scans and for building therefrom a render queue having a list of volume bricks that represents the volumetric scans in graphics memory, for determining a type signature based on the types and sequence of the volumetric scans representing the scene, and for preparing specific volumetric scans for rendering by packing the specific volumetric scans into 3D textures, wherein each brick in the render queue provides texture coordinates to retrieve the data from the 3D textures;
   a shader builder for receiving shader functionality and the type signature of the volumetric scans from the data manager, for receiving transfer functions for each volumetric scan, and for selecting a compositing rule table from the database based on the type signature of the volumetric scans and for building a plurality of shaders from a library of graphics functions based on the received shader functionality and selected compositing rule table; and
   a sampler that receives the render queue, the 3D textures, and the plurality of shaders for rendering a final image of the volumetric scans, wherein for each brick contained in the render queue the sampler determines the least complex shader based on the render parameters and transfer functions in the scene, and binds such shader and the required 3D textures to form the final image one brick at a time.

2. A computer-implemented method for fused volume rendering a set of volumetric scans acquired from different imaging modalities, the method performed by the computer comprising the steps of:
   providing a plurality of 3D textures that hold data of the different volumetric scans;
   providing a render queue containing a plurality of bricks that provide texture coordinates to retrieve volumetric scan data from the 3D textures;
   providing a shader database containing a shader for every possible combination of the different volumetric scans and render styles for said volumes;
   specifying a visibility and render style for each brick in the render queue based on global rendering parameters and on transfer functions associated with each different volumetric scans, wherein each volumetric scan is associated with a transfer function; and
   rendering each brick in the render queue in depth sorted order.

3. The method of claim 2, wherein rendering each brick in the render queue comprises, for each visible brick:
   finding, based on the visibility and render style of each different volumetric scan to be fused for each brick, a least complex shader from said shader database to render the brick;
   binding, for each different volumetric scan, the 3D textures required for rendering; and
   using the shader to render each different volumetric scan covered by a geometrical extent of each brick in the specified render style for each different volumetric scan.

4. The method of claim 3, further comprising:
   providing a compositing rule table database containing a plurality of compositing rule tables, wherein each table provides compositing rules for each different combination of volumetric scans into the rendered scene;
   selecting a compositing rule table for the different imaging modalities of the set of volumetric scans,
   wherein each shader in said shader database corresponds to one of the compositing rules in the selected compositing rule table, and
   wherein finding a least complex shader from said shader database to render the brick comprises finding a least complex compositing rule required to render the brick, and binding the shader from the shader database that matches the least complex compositing rule.

5. A non-transitory program storage device readable by a computer, tangibly embodying a program of instructions executable by a computer to implement a system for fused volumetric rendering of a scene from a set of volumetric scans acquired from different imaging modalities, the system implemented by the computer comprising:

a compositing rule table database having therein a plurality of compositing rule tables, wherein each table provides compositing rules for a different combination of volumetric scans into the rendered scene;

a data manager for receiving the volumetric scans and for building therefrom a render queue having a list of volume bricks that represents the volumetric scans in graphics memory, for determining a type signature based on the types and sequence of the volumetric scans representing the scene, and for preparing specific volumetric scans for rendering by packing the specific volumetric scans into 3D textures, wherein each brick in the render queue provides texture coordinates to retrieve the data from the 3D textures;

a shader builder for receiving shader functionality and the type signature of the volumetric scans from the data manager and transfer functions in the scene, and for selecting a compositing rule table from the database based on the type signature of the volumetric scans and for building a plurality of shaders from a library of graphics functions based on the received shader functionality and selected compositing rule table; and a sampler that receives the render queue, the 3D textures, and the plurality of shaders for rendering a final image of the volumetric scans, wherein for each brick contained in the render queue the sampler determines the least complex shader based on the render parameters and transfer functions in the scene, and binds such shader and the required 3D textures to form the final image one brick at a time.

6. A non-transitory program storage device readable by a computer, tangibly embodying a program of instructions executable by a computer to implement a method for fused volume rendering a set of volumetric scans acquired from different imaging modalities, the method performed by the computer comprising the steps of:

providing a plurality of 3D textures that hold data of the different volumetric scans;

providing a render queue containing a plurality of bricks that provide texture coordinates to retrieve volumetric scan data from the 3D textures;

providing a shader database containing a shader for every possible combination of the different volumetric scans and render styles for said volumes;

specifying a visibility and render style for each brick in the render queue based on global rendering parameters and on transfer functions associated with each different volumetric scans, wherein each volumetric scan is associated with a transfer function; and rendering each brick in the render queue in depth sorted order.

7. The computer readable program storage device of claim 6, wherein rendering each brick in the render queue comprises, for each visible brick:

finding, based on the visibility and render style of each different volumetric scan to be fused for each brick, a least complex shader from said shader database to render the brick;

binding, for each different volumetric scan, the 3D textures required for rendering; and using the shader to render each different volumetric scan covered by a geometrical extent of each brick in the specified render style for each different volumetric scan.

8. The computer readable program storage device of claim 7, wherein the method further comprises:

providing a compositing rule table database containing a plurality of compositing rule tables, wherein each table provides compositing rules for each different combination of volumetric scans into the rendered scene;

selecting a compositing rule table for the different imaging modalities of the set of volumetric scans, wherein each shader in said shader database corresponds to one of the compositing rules in the selected compositing rule table, and wherein finding a least complex shader from said shader database to render the brick comprises finding a least complex compositing rule required to render the brick, and binding the shader from the shader database that matches the least complex compositing rule.

* * * * *